United States Patent
Steele et al.

(10) Patent No.: US 9,852,097 B2
(45) Date of Patent: Dec. 26, 2017

(54) FLEXCONNECT DISCONNECT DETECTION

(71) Applicant: Microchip Technology Incorporated, Chandler, AZ (US)

(72) Inventors: Brigham Steele, San Tan Valley, AZ (US); Atish Ghosh, Austin, TX (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 214 days.

(21) Appl. No.: 14/698,526

(22) Filed: Apr. 28, 2015

(65) Prior Publication Data

US 2015/0309953 A1    Oct. 29, 2015

Related U.S. Application Data

(60) Provisional application No. 61/985,758, filed on Apr. 29, 2014.

(51) Int. Cl.
*G06F 13/40* (2006.01)
*G06F 11/30* (2006.01)

(52) U.S. Cl.
CPC ...... *G06F 13/4022* (2013.01); *G06F 11/3051* (2013.01); *Y02B 60/1228* (2013.01); *Y02B 60/1235* (2013.01)

(58) Field of Classification Search
CPC ............ G06F 13/4022; G06F 11/3051; Y02B 60/1228; Y02B 60/1235
See application file for complete search history.

(56) References Cited

U.S. PATENT DOCUMENTS

| | | | |
|---|---|---|---|
| 7,480,753 B2 | 1/2009 | Bohm et al. | 710/104 |
| 7,502,878 B1* | 3/2009 | Wright | G06F 13/4022 710/37 |
| 7,765,344 B2* | 7/2010 | Wright | G06F 13/4022 710/14 |
| 2004/0019732 A1* | 1/2004 | Overtoom | G06F 13/4022 710/313 |
| 2004/0088449 A1* | 5/2004 | Sakaki | G06F 13/385 710/15 |
| 2006/0076977 A1 | 4/2006 | Zhu | 326/86 |
| 2007/0088449 A1 | 4/2007 | Denton et al. | 700/99 |
| 2007/0255885 A1 | 11/2007 | Bohm et al. | 710/316 |
| 2015/0137791 A1* | 5/2015 | Remple | G01N 27/00 324/76.11 |

OTHER PUBLICATIONS

Steele, Brigham, "AN1700—FlexConnect Applications," Microchip Technology Incorporated, 15 pages, ©2004.
International Search Report and Written Opinion, Application No. PCT/US2015/028252, 13 pages, Jul. 23, 2015.

* cited by examiner

*Primary Examiner* — Idriss N Alrobaye
*Assistant Examiner* — Ronald Modo
(74) *Attorney, Agent, or Firm* — Slayden Grubert Beard PLLC

(57) ABSTRACT

A USB hub includes a plurality of downstream ports; at least one dual mode port, the dual mode port configured to be switchable from a downstream port to an upstream port; and host detection circuitry for detecting whether, when operating as an upstream port, a host is connected.

17 Claims, 8 Drawing Sheets

FLEXCONNECT DISCONNECT DETECTION

CROSS REFERENCE TO RELATED APPLICATIONS

This application is a conversion of, and claims benefit of priority to, U.S. Provisional Patent Application Ser. No. 61/985,758, filed Apr. 29, 2014, which is hereby incorporated by reference in its entirety as if fully set forth herein.

TECHNICAL FIELD

The present disclosure relates to universal serial bus (USB) technology, and in particular, to USB 2.0 and USB 3.0 hub devices.

BACKGROUND

The Universal Serial Bus (USB) 1.0 specification was originally developed in the 1990s to provide a bus and interface(s) to standardize communication between computers and peripheral devices, such as keyboards, printers, cursor pointing devices, external drives, and the like. Since then, USB has progressed into versions 2.0 and 3.0 and has become ubiquitous in computers as well as portable devices, such as smartphones, tablet computers, and MP3 players.

In general, in USB communication, one device acts as a Host while another acts as a Device. The Host powers the bus, issues commands, and generally maintains control over the connection. The Device does not initiate any activity for control of the bus. For example, a personal computer acts as a Host to a USB "thumb" drive Device.

The On-the-Go Specification allows a single Host and single Device to swap roles. For example, some tablet computers may function in a Device role and operate as a mass storage device when coupled to a personal computer Host, but may function as a Host when coupled to a peripheral device such as a keyboard.

USB hubs expand a single USB port into several so that more devices can be connected. A personal computer or automotive entertainment system, for example, may include multiple external USB ports but have an internal hub, rather than dedicated USB controllers for each port. As can be appreciated, difficulties can arise, however, in employing a USB hub with On-the-Go devices.

However, the Flexconnect-enabled hubs (USB 2.0 and USB 3.0 hubs) produced by the Assignee of the present application are unique in the industry in that they can swap the upstream (Host) side port with one of the downstream (Device) side ports. In effect, a dual role (Host/Device) can take over the hub from the downstream port. Details on such a Flexconnect enabled hub may be found in U.S. Pat. No. 7,480,753, which is hereby incorporated by reference in its entirety as if fully set forth herein.

Normally, a USB host provides a signal called VBUS to tell the Hub it is present. VBUS is also a power signal that can be used to power the Hub. If a dual role device like an iPad® is plugged into the Device side port, it always wants to receive power, even if it is the Host. Since the Device, now acting as Host, is not providing VBUS, there is no way for the Hub to know if the USB 2.0 Host has disconnected. Lack of activity is not a sufficient indicator: when there is no activity the Hub simply goes into the suspend state to save power.

That is, when the Hub is providing VBUS to the Host, there is no way to tell if the Host has entered suspend or if it is disconnected. Normal USB operation expects the presence of VBUS to go away when the Host has been disconnected. With VBUS always present, the Hub must be able to decipher between a USB Suspend case and a Host Disconnect case Accordingly, there is a need for a method to detect a disconnection of a Host in a dual role USB port of a USB Hub.

SUMMARY

According to various embodiments, to detect the disconnect, once the Hub has gone into suspend, internal firmware uses USB battery charging contact detection to detect that the Host has gone away. Thus, the Hub will be able to provide VBUS and detect when a USB Host has been disconnected.

A USB hub in accordance with embodiments includes a plurality of downstream ports; at least one dual mode port, the dual mode port configured to be switchable from a downstream port to an upstream port; and host detection circuitry for detecting whether, when operating as an upstream port, a host is connected.

In some embodiments, the circuitry is operable when the dual mode port has entered a suspend state. In some embodiments, the at least one dual mode port further includes a DP connection line and a DM connection line. Such a DM connection line may be coupled with the host detection circuitry and, when operating as an upstream port, connection of the host can be determined by means of the host detection circuitry, which causes a predetermined logic value to be identified at the DM line when a host is disconnected.

In some embodiments, the host detection circuitry includes a current source. In some embodiments, the current source is a 10 uA current source coupled between the DM connection line and ground. In some embodiments, the host detection circuitry includes a pull up resistor coupled to the DM connection line.

In some embodiments, the hub includes a controller configured to switch modes on the dual mode port such that the dual mode port switches back to functioning as a downstream port when the host is determined to have been disconnected.

A method in accordance with embodiments includes, in a USB hub including a dual mode port, switching a USB port function of the dual mode port from a first mode as a downstream port to a second mode as an upstream port; and upon entering a suspend state, periodically sampling a logic level of a DM connection line provided by host detection circuitry to determine if a host is still connected.

In some embodiments, the host detection circuitry includes a current source coupled between the DM connection line and ground. In some embodiments, the current source comprises a 10 uA current source. In some embodiments, the host detection circuitry includes a pull up resistor coupled to the DM connection line. In some embodiments, a pull up resistor is coupled to a DP connection line, wherein the host is detected as being connected when the DP connection line and the DM connection line are determined to have same predetermined logic levels. In some embodiments, the dual mode port switches back to functioning as a downstream port when the host is determined to have been disconnected.

A USB hub in accordance with embodiments includes a controller; a plurality of downstream ports; at least one dual mode port, the dual mode port configured to be switchable by the controller from a downstream port to an upstream port; and host detection circuitry for providing indicia to the controller of whether, when operating as an upstream port, a host is connected.

In some embodiments, the circuitry is operable when the dual mode port has entered a suspend state. In some embodiments, the at least one dual mode port further includes a DP connection line and a DM connection line coupled with the host detection circuitry. When operating as an upstream port, connection of the host can be determined by means of the host detection circuitry. The host detection circuitry causes a predetermined logic value to be identified at the DM connection line when a host is disconnected.

In some embodiments, the host detection circuitry includes a current source. In some embodiments, the current source is a 10 uA current source coupled between the DM connection line and ground. In some embodiments, the host detection circuitry includes a pull up resistor coupled to the DM connection line. In some embodiments, the controller is configured to switch modes on the dual mode port such that the dual mode port switches back to functioning as a downstream port when the host is determined to have been disconnected.

These, and other aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
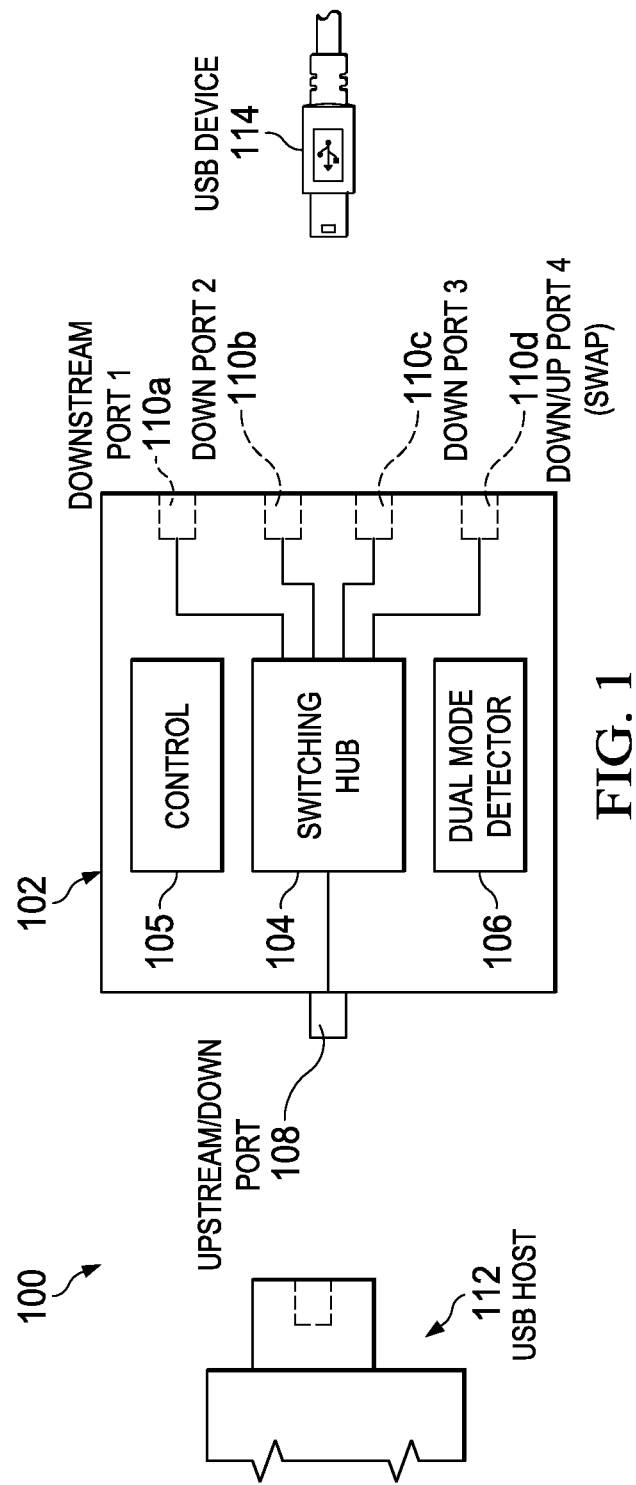
FIG. 1 is a diagram of an example system in accordance with embodiments.

Turning now to the drawings and, with particular attention to FIG. 1, a diagram illustrating an example USB Hub environment in accordance with embodiments is shown. As shown, the system 100 includes a Hub 102, one or more control processors 105, a USB Host 112, and a USB Device 114.

In the embodiment illustrated, the USB Hub 102 has three downstream ports 110a, 110b, 110c, a swappable downstream port 110d, and a swappable upstream port 108. A switching hub 104 provides switching between the ports 108 and 110a-110d. The control processor 105 functions to receive and process signals over the USB port(s) and supervise switchover of ports from upstream to downstream functionality, as will be described in greater detail below.

The USB Hub 102 typically operates such that all of the ports 110a-110d function as downstream ports, while the port 108 functions as an upstream port. However, in certain cases, the USB Hub 102 may swap the functions of the ports 108 and 110d. Thus, port 108 will function as a downstream port while port 110d will function as an upstream port. In addition, the USB Hub 102 may include a dual mode detection circuitry 106, as will be explained in greater detail below. The USB Hub 102 may be embodied as a USB46×4 hub available from the Assignee of the current application.

Figure 2:
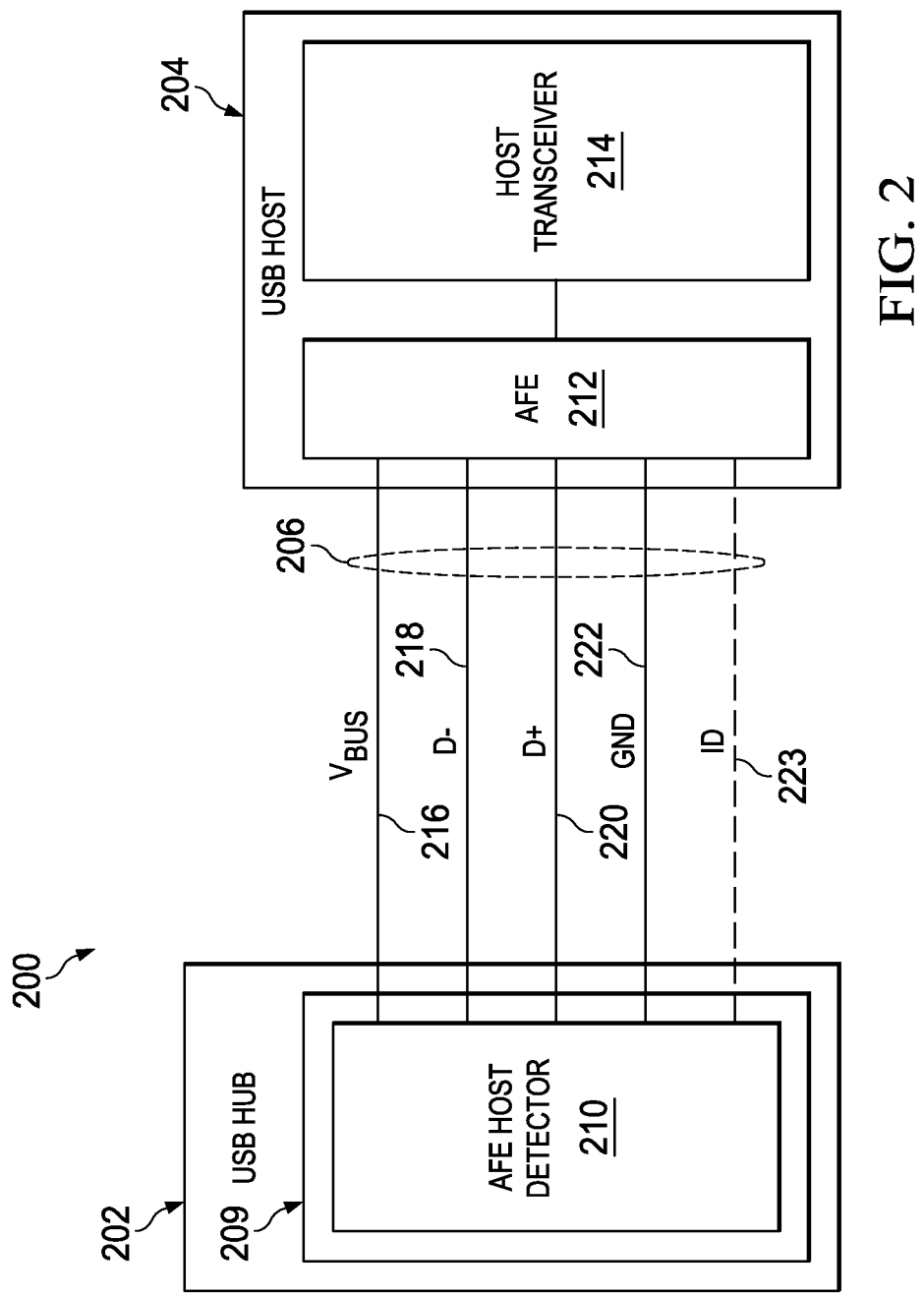
FIG. 2 is diagram of example port configuration in accordance with embodiments.

Shown in FIG. 2 is an example swap port connection in accordance with embodiments. As shown, system 200 includes a USB Hub 202 and USB Host 204. The USB Hub 202 includes a swap port 209 having a host detection or dual mode detection analog front end (AFE) circuitry 210. For sake of simplicity, remaining ports and components of the hub are not shown. Similarly, the USB Host 204 includes USB AFE port circuitry 212 and a host transceiver 214.

The USB Host 204 and USB Hub 202 are coupled via a USB Bus 206. Such a USB Bus 206 typically includes four lines: Vbus 216, D− (also referred to as DM) 218, D+ (also referred to as DP) 220, and Ground 222. Vbus 216 and Ground 222 provide power, while data is carried on DP 220 and DM 218. In addition, some USB connectors (specifically, the u or miniAB connectors) employ an additional ID line 223.

As will be explained in greater detail below, the Hub swap port 209 is configured to detect the presence of a Host via the DM 218 and DP 220 lines.

Figure 3:
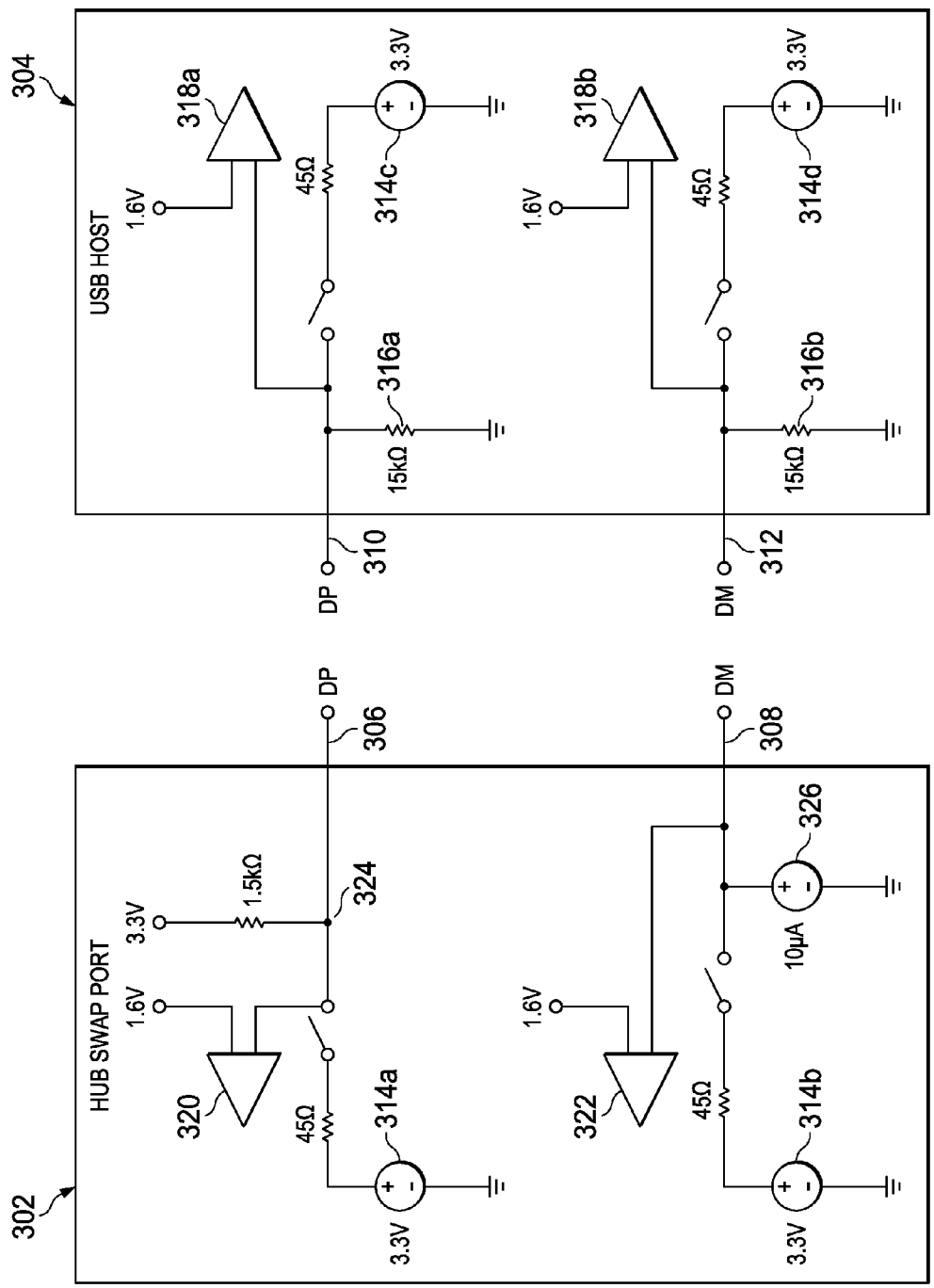
FIG. 3 is a diagram illustrating example analog port interfaces in accordance with embodiments.

Example circuitry for doing so is shown more particularly with regard to FIG. 3. Shown is a Hub dual mode swap port 302 on the Hub and a USB Host port 304 on the USB Host (which formerly functioned as the Device).

The USB Host port 304 includes connection circuitry 310 connected to DP and connection circuitry 312 connected to DM. Circuitry 310 couples to DP with a 15 kΩ pull down resistor 316a. In addition, a driver 314c including a voltage source and 45 Ω resistor and switch is coupled to DP. Finally, DP is coupled to a comparator 318a whose other input is coupled to a 1.6 V source. Similarly, circuitry 312 couples to DM with a 15 kΩ pull down resistor 316b. In addition, a driver 314d including a voltage source, 45 Ω resistor, and switch are coupled to DM. Finally, DM is coupled to a comparator 318b whose other input is coupled to a 1.6 V source. DP and DM function as a differential data pair, with a one or zero being transmitted by alternately using drivers 314c, 314d and corresponding drivers 314a, 314b on the Hub swap port 302.

The Hub swap port 203 includes DP circuitry 306 and DM circuitry 308. In the embodiment illustrated, the DP circuitry 306 includes driver 314a comprising a voltage source, 45 Ω resistor, and switch. The DP circuitry 306 further includes a 1.5 kΩ pull up resistor coupled to 3.3 V and comparator 320 with one input tied to reference voltage and another to the DP line.

The DM circuitry 308 similarly includes driver 314b comprising a voltage source, 45 Ω resistor, and switch and comparator 322 having one input tied to reference voltage and another to the DM line. In addition, in the embodiment illustrated, a 10 μA current source 326 is provided coupled to the DM line. It is noted that the values of the resistors and other components may be suitably changed as necessary. Thus, the figures are exemplary only.

In operation, as will be described in greater detail below, if the Host 204 stops sending state of frame packets (SOFs) (not shown), the Hub 202 is to enter the Suspend state within 3 ms. Once this occurs, the Hub's control processor (FIG. 1) samples the states of the DP/DM pins periodically to determine the presence of the Host.

If the Host is present, then the Host's 15 k pull down resistor 316b on DM will cause the DM pin to be sampled as a logic 0 by the Hub. If the Host is disconnected, then the 10 μA current source 326 will cause the DM pin to be sampled as a logic 1 by the Hub. If the Host is determined to be disconnected, the Hub will disable the swap state and revert to the default upstream port passing control back to the original Host.

Figure 4A:
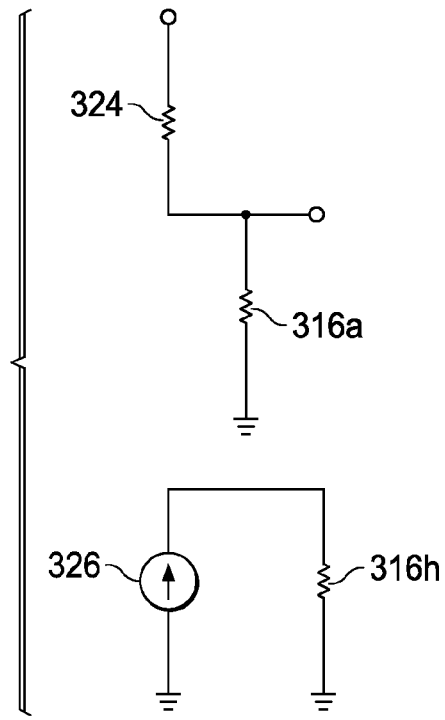
FIG. 4A and FIG. 4B illustrate operation of the port(s) of FIG. 3.
Figure 4B:
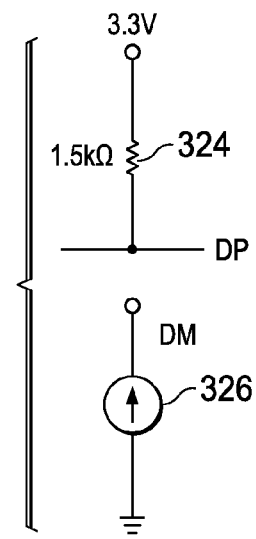

This is shown more particularly at FIG. 4A and FIG. 4B. In FIG. 4A, as shown, if the Host is connected, then the 1.5 kΩ pull up resistor 324 on the Hub and the 15 kΩ pull down resistor 316a on the Host form a circuit in the DP line. Similarly, the current source 326 and the pull down resistor 316b define a circuit on the DM line. However, at FIG. 4B, if the Host is disconnected, the pull up resistor 324 pulls the DP line up to 1. Likewise, the current source 326 causes the DM line to register high.

Figure 5A:
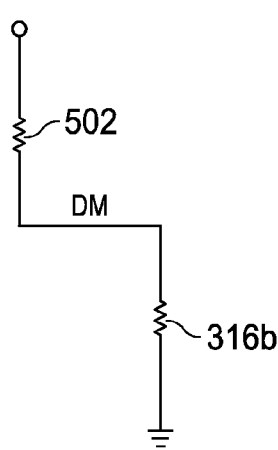
FIG. 5A and FIG. 5B illustrate operation of another embodiment of the port of FIG. 3.
Figure 5B:
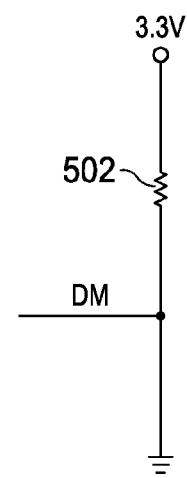

In some embodiments, the current source 326 may be replaced with a sufficiently large pull up resistor (e.g., 125 kΩ) tied to the DM line. This is shown in FIG. 5A and FIG. 5B. In FIG. 5A, when the Host is connected, the pull up resistor 502 and the pull down resistor 316b define a circuit on the DM line. If disconnected, the pull up resistor 502 pulls up the DM line.

It is noted that, while similar to battery charger detection circuitry, such circuitry is not normally provided on USB Hubs. Further, in conventional battery charger detect circuitry, such circuitry, the 10 uA source or 125 k pull up resistor is usually applied to DP, not DM.

Figure 6:
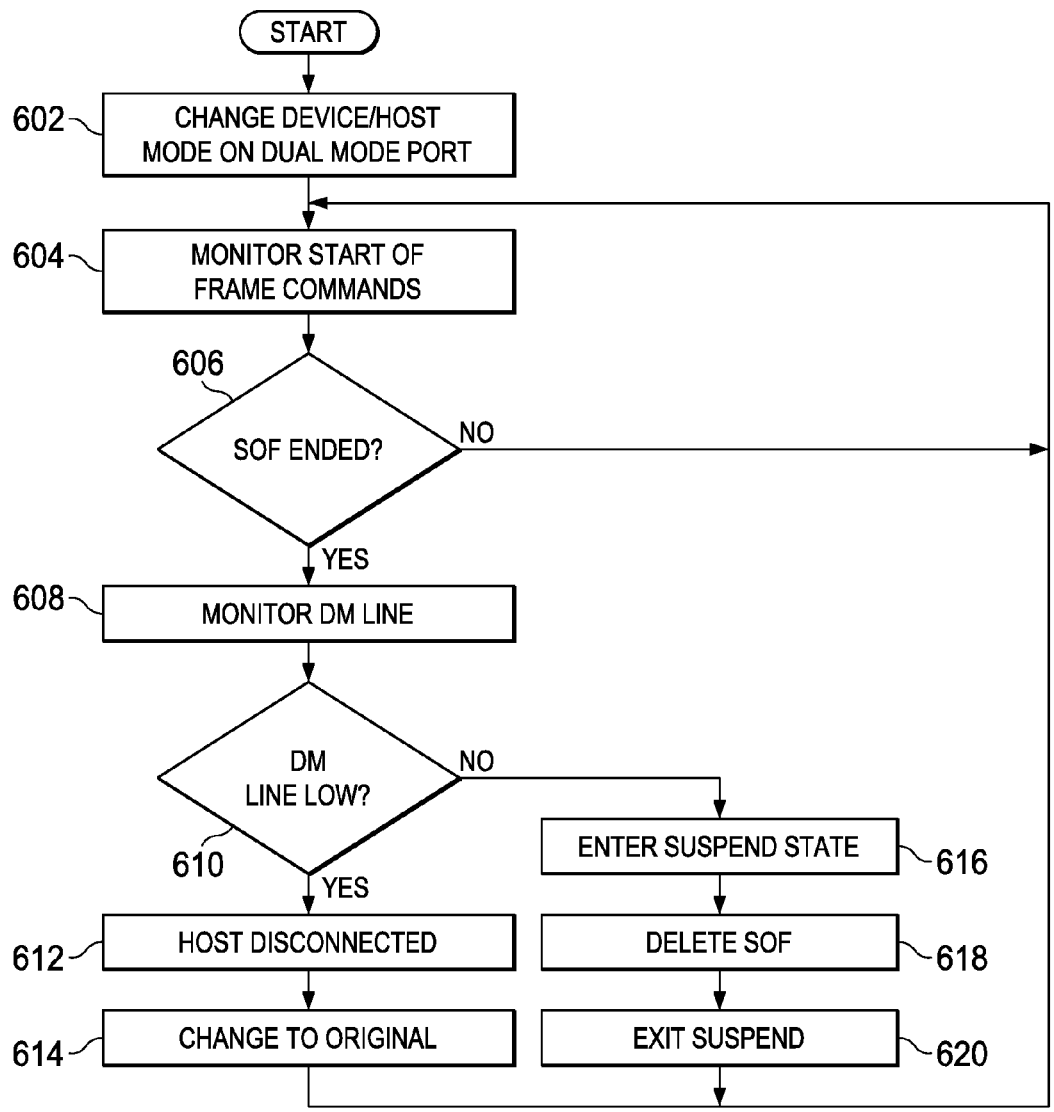
FIG. 6 is a flowchart illustrating operation of embodiments.

Operation of embodiments is shown more particularly with regard to the flowchart of FIG. 6. Initially, in a step 602, the upstream Host and a downstream Device on the dual mode port switch functions. This may be in response to, for example, a setup packet sent by the USB Device, indicating to the Hub that it wishes to function as Host.

The Hub controller will then monitor the lines for start of frame commands, in a step 604. If the start of frame commands end, as determined in a step 606, then the Hub will begin to monitor the state of the DM line, in a step 608. If the DM line is low, as determined at 610, then the Host is determined to be disconnected, in a step 612. In that case, in a step 614, the default Host/Device configuration is restored. If the DM line was not low, the in a step 616, the Hub will enter a suspend state. If it next detects a start of frame or other command, as determined in step 618, it will exit the suspend state, and the process returns to step 604.

Figure 7A:
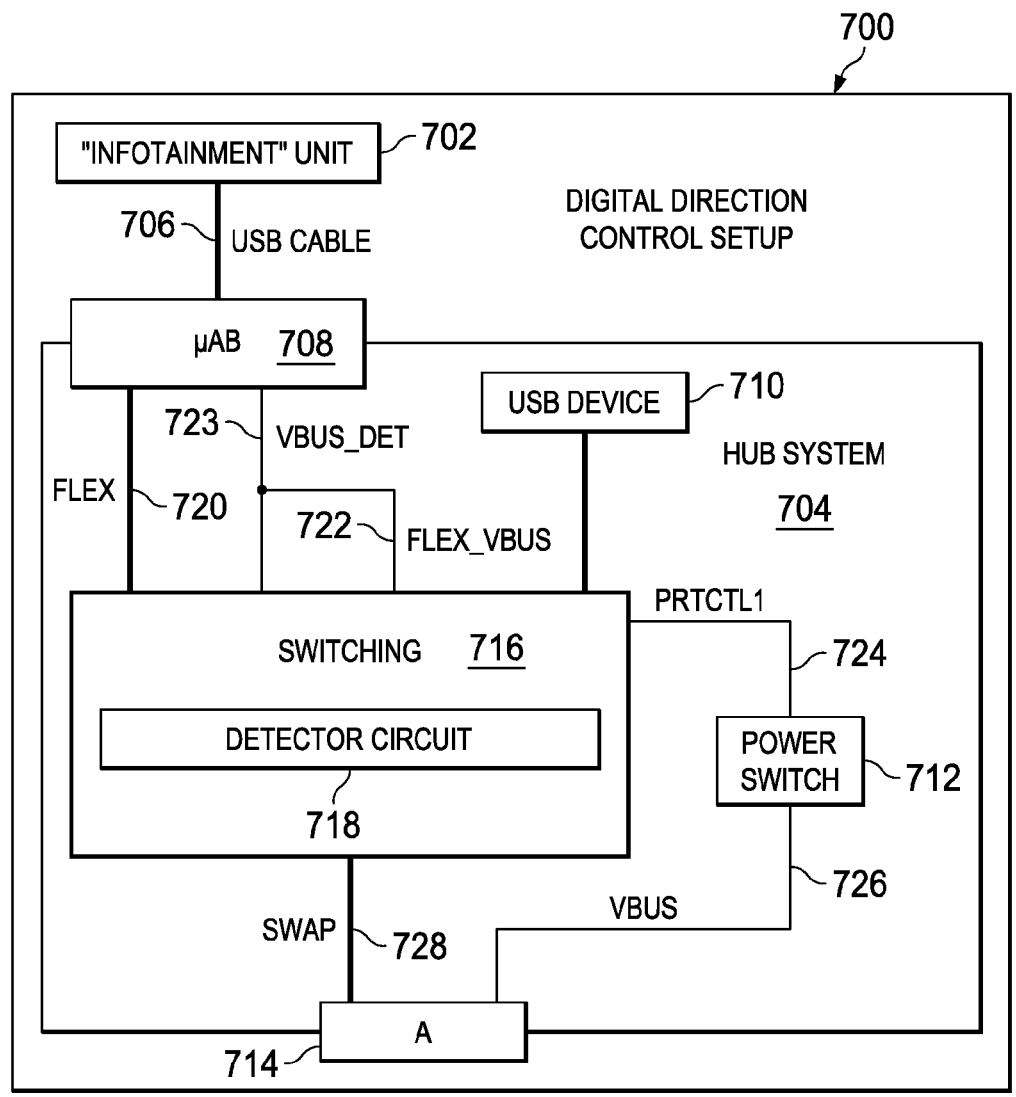
FIG. 7A-FIG. 7C illustrate operation of a system that may use Host detection in accordance with embodiments.

Embodiments as claimed may be particularly suited for operation in conjunction with automotive entertainment and information ("infotainment") systems. Such a system is shown with regard to FIGS. 7A-7C. As shown, system 700 includes an infotainment unit 702 coupled via a USB cable 706 and uAB port 708 to a Hub System 704. Hub system 704 may include a switching hub 716, one or more on-board USB devices 710, a power switch 712, and an A port 714. The switching hub 716 may include Host detection circuitry 718 which operates as discussed above. In the embodiment illustrated, the switching hub 716 is connected to the uAB port via Flex lines 720 and to its Vbus pin via Flex Vbus 722. In the embodiment illustrated, Vbus is also coupled to a VBUS_DET input of the switching hub 716.

On the A side, the switching hub 716 couples to the DP and DM pins of the A port via SWAP line 728. The Vbus from the external device is provided to power switch 712 at 726. Finally, the switching hub 716 controls the power switch 712 via control line 724. When a device is connected, the power switch 712 is always left on.

Figure 7B:
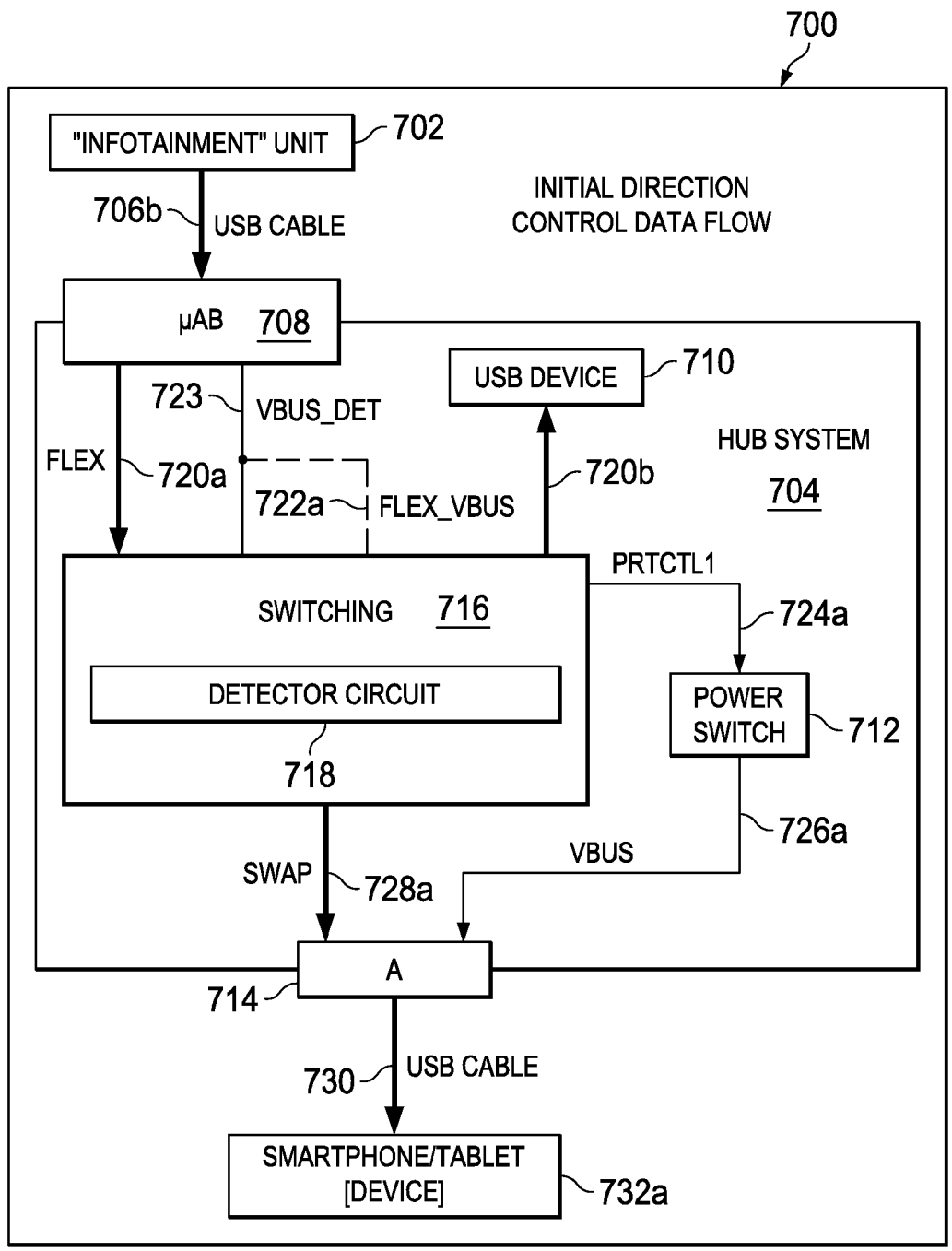
Figure 7C:
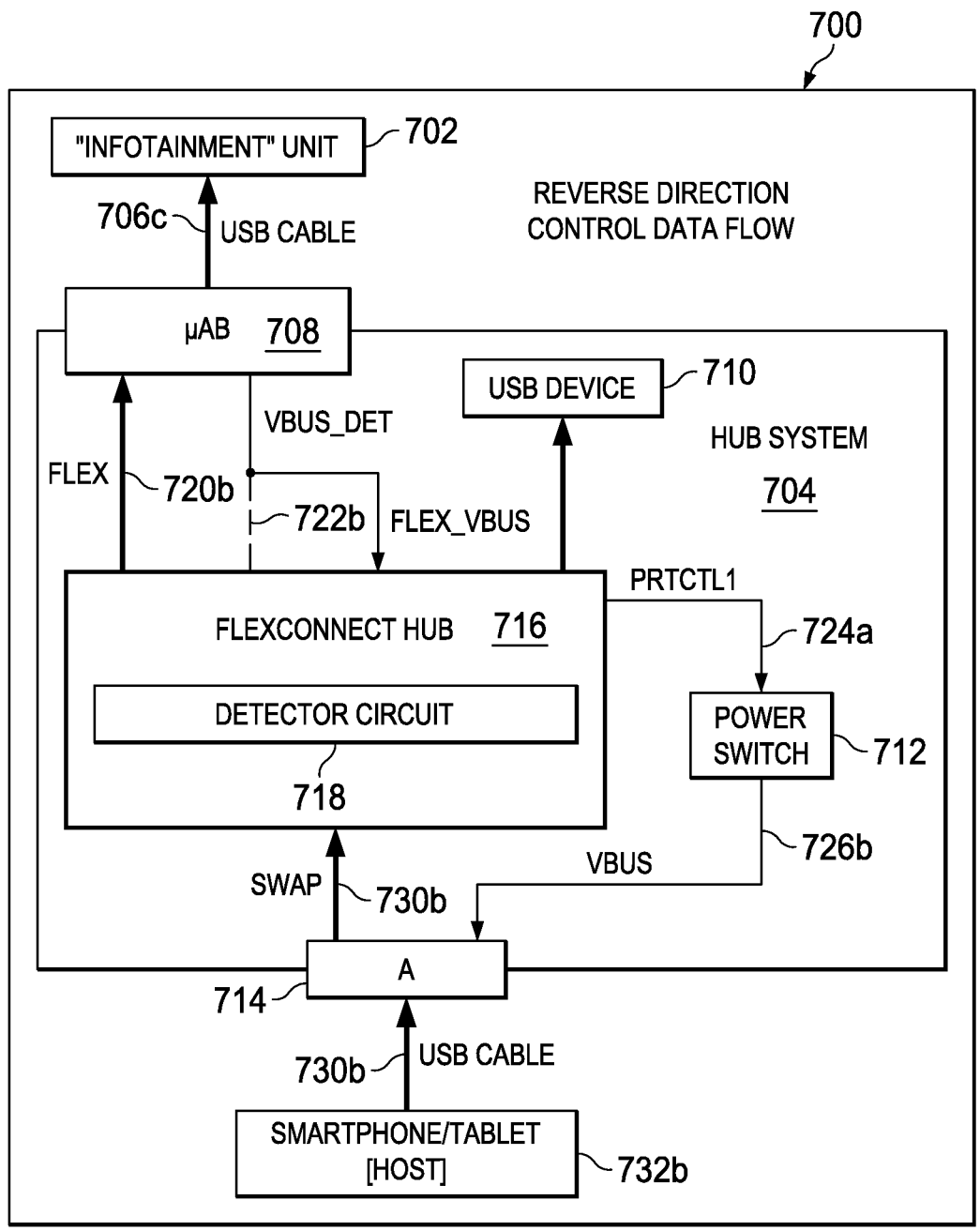

Operation of the environment 700 in a device mode is shown in FIG. 7B. Broadly speaking, in operation, the hub system 704 will have battery charging enabled on the downstream A port 714 and has enumerated the other downstream ports (e.g., the ones to which USB devices 710 are coupled). When the smartphone is connected to the A port 714, it detects the Vbus voltage and battery charging handshake and starts charging. The infotainment unit 702 enumerates and controls the smartphone 732a.

More particularly, as shown in FIG. 7B, at 724a, the switching hub 716 pulls the power control line high to enable battery charging. In response, power switch 712 provides power on Vbus at 726a. The infotainment unit 702 drives VBUS_DET high at 722a to signal it is ready to enumerate. The host port 708 will detect the switching hub 716, at 720a, and enumerate the devices 710 coupled thereto, at 720b. The switching hub 716 will then detect the smartphone 732a connected to the USB Port A 714 via USB cable 730 and it will enumerate it as a Device.

In some embodiments, the infotainment unit 702 may then pass control of the switching hub 716 over to the smartphone 732b if the user wants to use the interface provided with it or if it provides more capability. This is shown more particularly in FIG. 7C.

As shown, in response to a setup command received from the smartphone 732b, the infotainment unit 702 receives an indicia that a direction change is desired. The infotainment unit 702 then sends out a direction change command to the smartphone 732b. The Hub then enumerates the smartphone 732b and the infotainment unit 702.

As noted above, during the direction change, the USB devices 710 still function as downstream devices, and the power switch stays on. If the smartphone is removed from connectivity, then the absence of it as host will be detected as set forth above.

What is claimed is:
1. A USB hub comprising:
    a dual mode upstream port configured to be switchable between operating as an effective upstream port and an effective downstream port;
    a plurality of downstream ports;

wherein at least one downstream port is a dual mode downstream port configured to be switchable between operating as an effective downstream port and an effective upstream port;

host detection circuitry for detecting, while a particular dual mode downstream port is operating as an effective upstream port and the dual mode upstream port is operating as an effective downstream port, whether a host is connected to the particular dual mode downstream port; and a controller configured to, in response to detection that the host is not connected to the particular dual mode downstream port operating as an effective upstream port, automatically (a) switch the particular dual mode downstream port back to functioning as an effective downstream port and (b) switch the dual mode upstream port back to functioning as an effective upstream port.

2. The USB hub of claim 1, wherein the circuitry is operable when the particular dual mode downstream port has entered a suspend state.

3. The USB hub of claim 1, wherein each dual mode downstream port further comprises a D+ (DP) connection line and a D− (DM) connection line;
wherein the DM connection line is coupled with the host detection circuitry;
wherein when a respective dual mode downstream port is operating as an effective upstream port, connection of the host can be determined by means of said host detection circuitry, wherein said host detection circuitry causes a predetermined logic value to be identified at the DM connection line when a host is disconnected.

4. The USB hub of claim 3, wherein the host detection circuitry comprises a current source.

5. The USB hub of claim 4, wherein the current source is a 10 uA current source coupled between the DM connection line and ground.

6. The USB hub of claim 3, wherein the host detection circuitry comprises a pull up resistor coupled to the DM connection line.

7. A method comprising:
in a USB hub including (a) an upstream dual mode port configured to be switchable between operating as an effective upstream port and an effective downstream port and (b) a downstream dual mode port configured to be switchable between operating as an effective downstream port and an effective upstream port, switching a first USB port function of the downstream dual mode port from a first mode as an effective downstream port to a second mode as an effective upstream port, and switching a second USB port function of the upstream dual mode port from a first mode as an effective upstream port to a second mode as an effective downstream port; and
upon entering a suspend state, periodically sampling a logic level of a D− (DM) connection line provided by host detection circuitry to determine if a host is still connected to the downstream dual mode port operating as an effective upstream port;
in response to determining that a host is not connected to the downstream dual mode port, automatically switching the downstream dual mode port back to functioning as an effective downstream port and switching the upstream dual mode port back to functioning as an effective upstream port.

8. The method according to claim 7, wherein the host detection circuitry comprises a current source coupled between the DM connection line and ground.

9. The method according to claim 8, wherein the current source comprises a 10 uA current source.

10. The method according to claim 7, wherein the host detection circuitry comprises a pull up resistor coupled to the DM connection line.

11. The method according to claim 7, further including a pull up resistor coupled to a D+ (DP) connection line, wherein the host is detected as being connected to the particular dual mode downstream port when the DP connection line and the DM connection line are determined to have same predetermined logic levels.

12. A USB hub comprising:
a controller;
a dual mode upstream port configured to be switchable between operating as an effective upstream port and an effective downstream port;
a plurality of downstream ports;
wherein at least one downstream port is a dual mode downstream port configured to be switchable by the controller between operating as an effective downstream port and an effective upstream port;
host detection circuitry for providing, while a particular dual mode downstream port is operating as an effective upstream port and the dual mode upstream port is operating as an effective downstream port, indicia to the controller of whether a host is connected to the particular dual mode downstream port; and
wherein the controller is configured to, in response to receiving indicia from the host detection circuitry indicating that the host is not connected to the particular dual mode downstream port operating as an effective upstream port, automatically (a) switch the particular dual mode downstream port back to functioning as an effective downstream port and (b) switch the dual mode upstream port back to functioning as an effective upstream port.

13. The USB hub of claim 12, wherein the circuitry is operable when the particular dual mode downstream port has entered a suspend state.

14. The USB hub of claim 13, wherein the at least one dual mode port further comprises a D+ (DP) connection line and a D− (DM) connection line;
wherein the DM connection line is coupled with the host detection circuitry;
wherein when a respective dual mode downstream port is operating as an effective upstream port, connection of the host can be determined by means of said host detection circuitry, wherein said host detection circuitry causes a predetermined logic value to be identified at the DM connection line when a host is disconnected.

15. The USB hub of claim 12, wherein the host detection circuitry comprises a current source.

16. The USB hub of claim 15, wherein the current source is a 10 uA current source coupled between the DM connection line and ground.

17. The USB hub of claim 14, wherein the host detection circuitry comprises a pull up resistor coupled to the DM connection line.

* * * * *

UNITED STATES PATENT AND TRADEMARK OFFICE
CERTIFICATE OF CORRECTION

PATENT NO. : 9,852,097 B2
APPLICATION NO. : 14/698526
DATED : December 26, 2017
INVENTOR(S) : Brigham Steele et al.

It is certified that error appears in the above-identified patent and that said Letters Patent is hereby corrected as shown below:

In the Specification

Column 4,
Lines 59-67, "The USB Host port 304 includes connection circuitry 310 connected to DP and connection circuitry 312 connected to DM. Circuitry 310 couples to DP with a 15 kQ pull down resistor 316a. In addition, a driver 314c including a voltage source and 45 Q resistor and switch is coupled to DP. Finally, DP is coupled to a comparator 318a whose other input is coupled to a 1.6 V source. Similarly, circuitry 312 couples to DM with a 15 kQ pull down resistor 316b. In addition, a driver 314d including a voltage source, 45 Q..." ---Change to--- "The USB Host port 304 includes connection circuitry 310 connected to DP and connection circuitry 312 connected to DM. Circuitry 310 couples to DP with a 15 k$\Omega$ pull down resistor 316a. In addition, a driver 314c including a voltage source and 45 $\Omega$ resistor and switch is coupled to DP. Finally, DP is coupled to a comparator 318a whose other input is coupled to a 1.6 V source. Similarly, circuitry 312 couples to DM with a 15 k$\Omega$ pull down resistor 316b. In addition, a driver 314d including a voltage source, 45 $\Omega$..."

Signed and Sealed this
Tenth Day of April, 2018

Andrei Iancu
*Director of the United States Patent and Trademark Office*